US012621124B2

(12) United States Patent (10) Patent No.: US 12,621,124 B2

Tucker et al. (45) Date of Patent: May 5, 2026

(54) NON-CRYPTOGRAPHIC HASHING USING CARRY-LESS MULTIPLICATION

(71) Applicant: Intel Corporation, Santa Clara, CA (US)

(72) Inventors: Gregory B. Tucker, Chandler, AZ (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/902,180

(22) Filed: Sep. 2, 2022

(65) Prior Publication Data

US 2023/0015000 A1 Jan. 19, 2023

(51) Int. Cl.
 *H04L 9/06* (2006.01)
 *G06F 9/30* (2018.01)
 *G06F 9/38* (2018.01)

(52) U.S. Cl.
 CPC ........ *H04L 9/0643* (2013.01); *G06F 9/30018* (2013.01); *G06F 9/30029* (2013.01); *G06F 9/3887* (2013.01)

(58) Field of Classification Search
 CPC .............. H04L 9/0643; G06F 9/30018; G06F 9/30029; G06F 9/3887
 See application file for complete search history.

(56) References Cited

U.S. PATENT DOCUMENTS

| | | | | |
|---|---|---|---|---|
| 2009/0141887 A1* | 6/2009 | Yap | ......................... | H04L 63/12 380/28 |
| 2010/0125728 A1* | 5/2010 | Gueron | .............. | G06F 9/30007 713/150 |

| | | | | |
|---|---|---|---|---|
| 2012/0138688 A1* | 6/2012 | Young | ................... | H04L 9/3226 347/110 |
| 2020/0134049 A1* | 4/2020 | Bassov | .............. | G06F 16/1752 |
| 2020/0327098 A1* | 10/2020 | Gonczi | .............. | G06F 16/1752 |
| 2021/0034578 A1* | 2/2021 | Dalmatov | .......... | G06F 16/1752 |

FOREIGN PATENT DOCUMENTS

WO WO-2022248130 A1 * 12/2022 ............... H04L 9/50

OTHER PUBLICATIONS

Gueron, et al., "Vortex: A New Family of One-Way Hash Functions Based on AES Rounds and Carry-Less Multiplication", 2008, Lecture Notes in Computer Science, vol. 5222, pp. 1-10 (Year: 2008).*

Gueron, et al., "Intel Carry-Less Multiplication Instruction and its Usage for Computing the GCM Mode", May 2010, White Paper Revision 2.0, pp. 1-76 (Year: 2010).*

* cited by examiner

*Primary Examiner* — Jonathan A Bui

(74) *Attorney, Agent, or Firm* — Compass IP Law PC

(57) ABSTRACT

Non-cryptographic hashing using carry-less multiplication and associated methods, software, and apparatus. Under one aspect, the disclosed hash solution expands on CRC technology that updates a polynomial expansion and final reduction, to use initialization (init), update and finalize stages with extended seed values. The hash solutions operate on input data partitioned into multiple blocks comprising sequences of byte data, such as ASCII characters. During multiple rounds of an update stage, operations are performed on sub-blocks of a given block in parallel including carry-less multiplication and shuffle operations. During a finalize stage, multiple SHA or carry-less multiplication operations are performed on data output following a final round of the update stage.

18 Claims, 10 Drawing Sheets

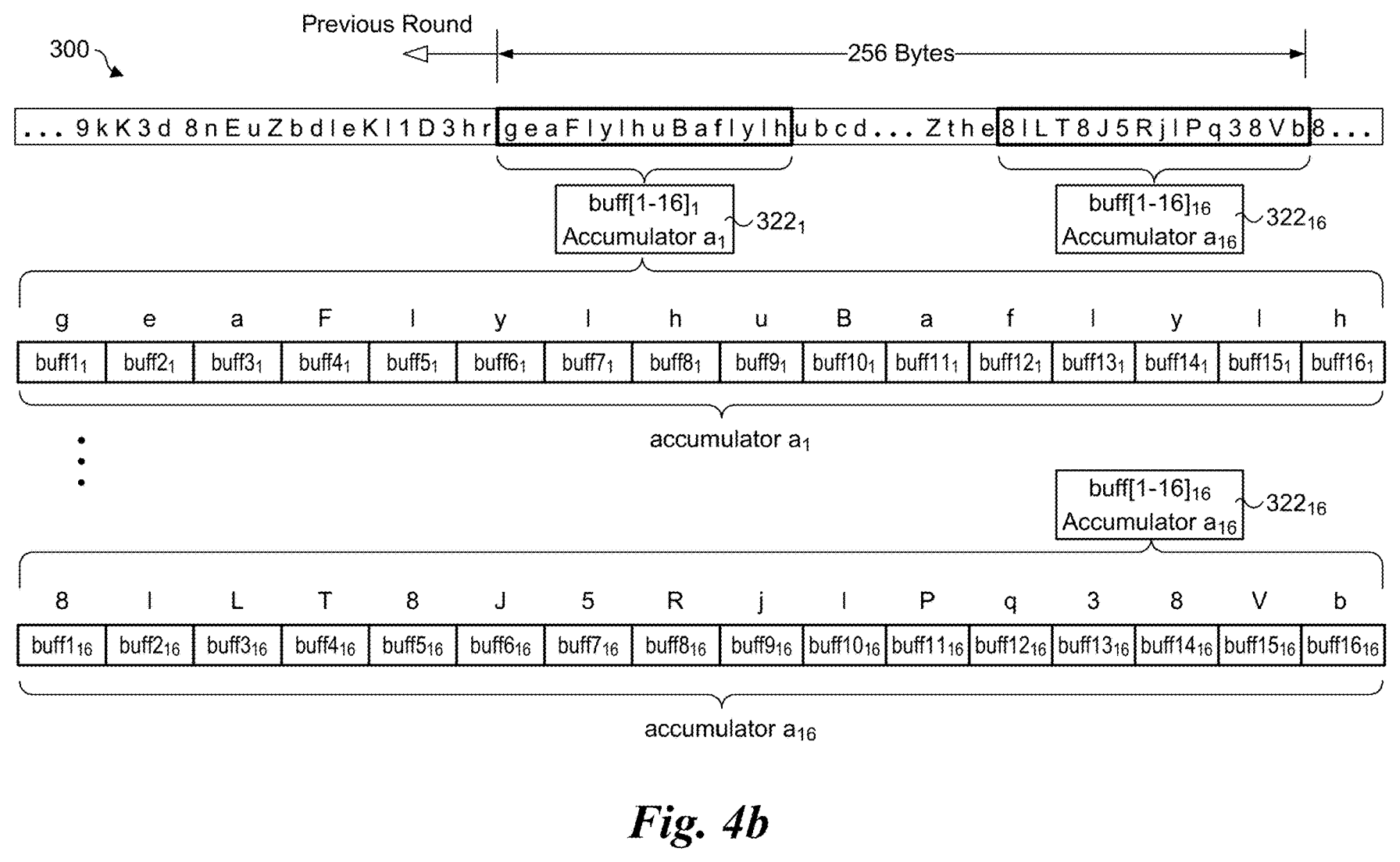

300

Previous Round

256 Bytes

...9kK3d8nEuZbdIeKl1D3hr geaFlylhuBaflylhubcd...Zthe8ILT8J5RjlPq38Vb8...

buff[1-16]$_1$
Accumulator a$_1$ — 322$_1$ buff[1-16]$_{16}$
Accumulator a$_{16}$ — 322$_{16}$ buff[1-16]$_{16}$
Accumulator a$_{16}$ — 322$_{16}$

| g | e | a | F | l | y | l | h | u | B | a | f | l | y | l | h |
|---|---|---|---|---|---|---|---|---|---|---|---|---|---|---|---|
| buff1$_1$ | buff2$_1$ | buff3$_1$ | buff4$_1$ | buff5$_1$ | buff6$_1$ | buff7$_1$ | buff8$_1$ | buff9$_1$ | buff10$_1$ | buff11$_1$ | buff12$_1$ | buff13$_1$ | buff14$_1$ | buff15$_1$ | buff16$_1$ | accumulator a$_1$ $\bullet\ \bullet\ \bullet$

| 8 | I | L | T | 8 | J | 5 | R | j | l | P | q | 3 | 8 | V | b |
|---|---|---|---|---|---|---|---|---|---|---|---|---|---|---|---|
| buff1$_{16}$ | buff2$_{16}$ | buff3$_{16}$ | buff4$_{16}$ | buff5$_{16}$ | buff6$_{16}$ | buff7$_{16}$ | buff8$_{16}$ | buff9$_{16}$ | buff10$_{16}$ | buff11$_{16}$ | buff12$_{16}$ | buff13$_{16}$ | buff14$_{16}$ | buff15$_{16}$ | buff16$_{16}$ | accumulator a$_{16}$

*Fig. 4b*

NON-CRYPTOGRAPHIC HASHING USING CARRY-LESS MULTIPLICATION

BACKGROUND INFORMATION

High quality hashing is important in many storage and communication systems. Previous solutions to high-quality hashing usually involve cryptographic hashes or fast hashes based on the avalanche properties of combining ordinary integer arithmetic (multiply, add, shift, etc.). Cryptographic hashes are often based on NIST or other published standards such as SHA, MD5 or SM3. While these cryptographic algorithms produce high-quality hashes, they are often computationally too complex to meet throughput or latency goals. Non-cryptographic hashes in use include Murmur, cityhash, xxhash and others, which are based on integer arithmetic alone. Many non-cryptographic hashes are of limited size, 32 to 64-bits, and/or of limited quality.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4b is a diagram showing data from a second portion of input data following the first portion being loaded into sets of accumulators to be processed during a second round of the update stage;

DETAILED DESCRIPTION

Figure 1:
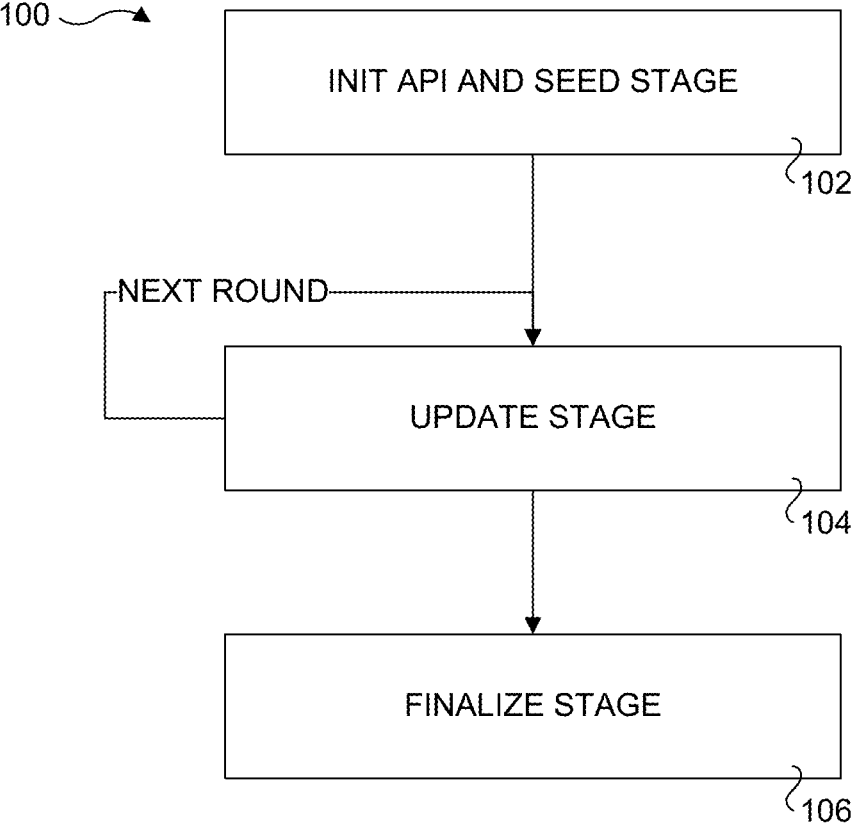
FIG. 1 is a flowchart illustrating a three-stage process for generating a hash digest, according to one embodiment.

Embodiments of non-cryptographic hashing using carry-less multiplication and associated methods and apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, a novel high-speed hashing technology is provided that employs technology developed for high-speed 64-bit CRC (Cyclic Redundancy Check) calculations to create high quality, 128-bit hashes of similar speed. The hashing technology leverages modern CPU (Central Processing Unit) Instruction Set Architecture (ISA) originally intended for cryptographic hash processes to produce non-cryptographic hashes that are both high speed and high quality, and generate larger digests than CRC digests.

Standard hashing techniques heavily use integer multiplication to perform the necessary mixing involved. For a 128-bit hash, combinations of 64×64-bit multiplication can be used or replaced with multiple 32×32-bit multiplication but these are expensive in time, must be mixed with other integer instructions, and have non-uniform mixing depending on bit position. Under the hash solution provided here we expand on CRC technology that updates a polynomial expansion and final reduction, to use init, update and finalize stages with extended seed values.

FIG. 1 shows a flowchart 100 illustrating an overview of the hashing solution, according to one embodiment. The process includes three stages, beginning with an init API and seed stage 102. This provides initial 128-bit values for the first round of the middle update stage 104. During this stage, the input data (e.g., file or stream for which a hash is generated over to produce a digest) are processed in 256-byte blocks per round, with the output of the update stage being used as an input to the next round of the update stage. Following processing of the last (complete) block of the input data a finalize stage 106 is performed that includes inputs from the init API and seed stage 102, middle update stage 104 and the remaining input data (which comprises a partial block of data).

Init API and Seed Stage

Figure 2:
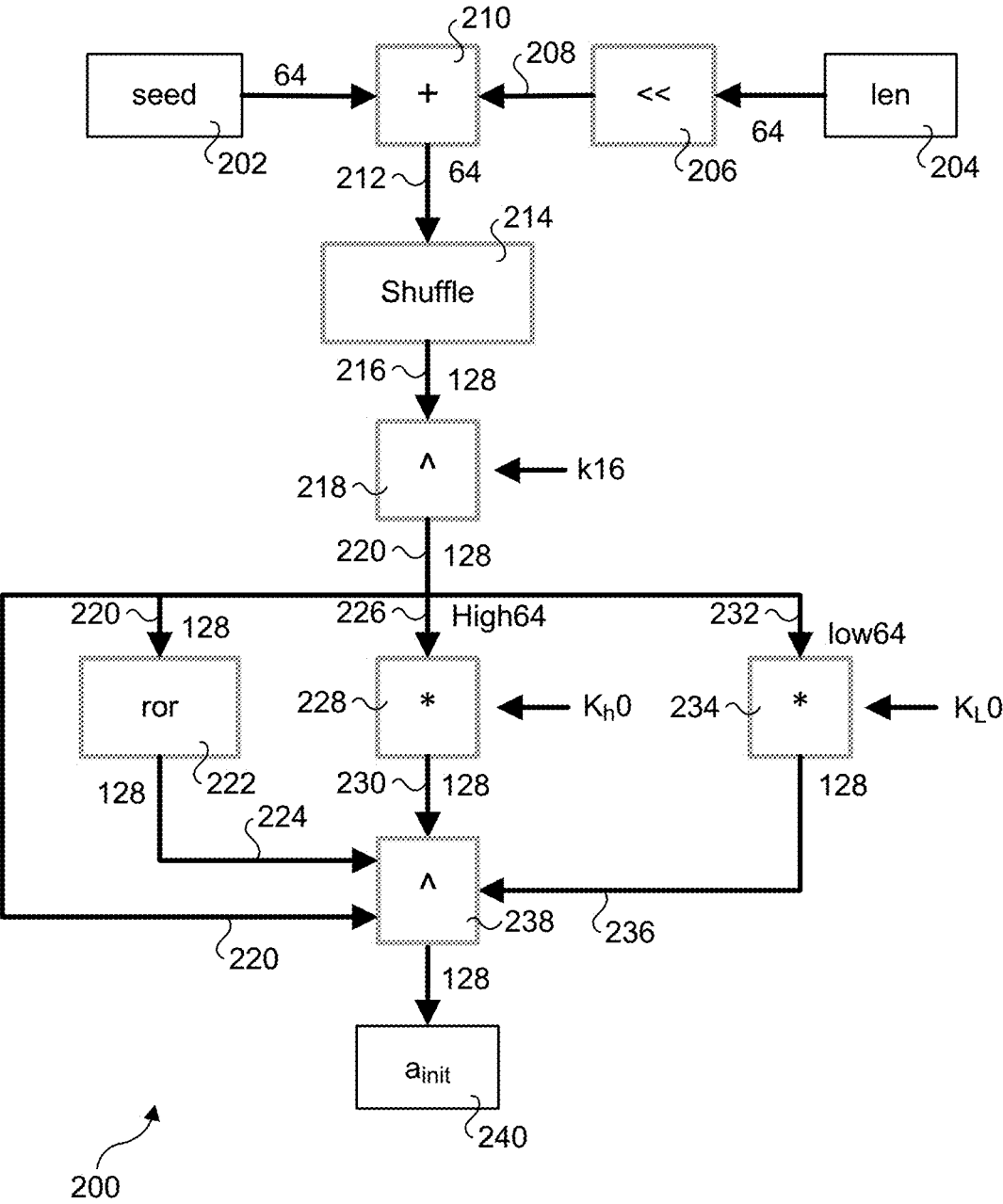
FIG. 2 is a process flow diagram illustrating input and operations for generating an init value, according to one embodiment.

A process flow diagram 200 illustrating the process performed by an embodiment of the init API and seed stage is shown in FIG. 2. A method call for the stage is, isal_hash128_w_seed_init(uint64_t_len, uint64_t_seed, struct hash_context ctx);

where the parameters are a 64-bit unsigned integer length len, a 64-bit unsigned seed, and a structure comprising a hash context. The length and initial seed are used with a new, bit avalanche inducing sequence that balances parallel operations for speed, some dependency for better mixing but with a final seeding contribution that is independent of the middle update stage. This allows for the entire init sequence to continue while the update stage is coprocessing, reducing latency for small input hashing.

In the following diagrams, including FIG. 2, a '+' symbol represents an addition operation, a '^' symbol represents a bitwise XOR operation, a '*' represents a carry-less multiplication operation, and an 'ror' represents a rotation of bits to the right. As shown in FIG. 2, the inputs are a 64-bit seed 202 and a 64-bit length 204. In block 206 the 64-bits for len 204 are shifted to the left by n positions, producing a 64-bit shifted output 208. In one embodiment, the bits are shifted to the left by 17 positions. 64-bit seed 202 and the shifted output 208 of block 206 are then added in a block 210, which outputs a 64-bit value 212.

In a shuffle block 214, a shuffle operation is applied to 64-bit value 212 to generate a 128-bit shuffle output 216. For instance, in one embodiment shuffle block 214 performs a mirror shuffle. In one embodiment a shufb instruction or the like may be used. This shuffle is primarily used to expand the 64 bits from the seed and length values to a 128-bit value by swapping and replicating two 32-bit parts to the upper 64 bits.

Continuing at a block 218, a bitwise XOR operation is performed on 128-bit shuffle output 216 and a random 128-bit constant k16, yielding a 128-bit output 220. 128-bit output 220 is used as an input for a ror (rotate right) block 222, which rotates the bits to the right by 17 to output a value 224. The 64 high bits 226 of 128-bit output 220 are multiplied by a 64-bit constant $K_h0$ in a block 228 to produce a 128 bit output 230. The 64 low bits 232 of 128-bit output 220 are multiplied by a 64-bit constant $K_L0$ in a block 234 to produce a 128 bit output 236.

In an XOR block 238, 128-bit outputs 220, 224, 230, and 236 are bitwise XOR'ed to generate a 128-bit output that becomes an initialization ($a_{init}$) value 240. The $a_{init}$ value is used as an input for the finalize stage discussed below.

Update Stage

The update stage integrates an input buffer and performs the bulk of the hash algorithm computation on large blocks. This stage updates up to 16 accumulators $\{a_1, \ldots, a_{16}\}$ in the illustrated embodiment based on block size and using two carry-less multiplication operations per accumulator $a_i$.

In one embodiment, blocks of 256 bytes are process for each update stage round. For blocks of less than 256 bytes, only a subset of accumulators need be calculated as there is data available. Blocks of 256 bytes can be calculated with all accumulator updates independently allowing parallel computation and no expensive reduction step in the main loop. Both carry-less multiplications for each accumulator can also be done in parallel. Because carry-less multiplication, like integer multiplication, is not uniform in mixing in all bit positions, a 16-byte shuffle is added each round to spread mixing power and maximize each input bit position's probability to affect all output bits.

The update process includes a first round employing random 128-bit values as a first input, and then uses the output from the previous stage as the input for the next round of the update stage. In one embodiment, each round processes a 256-byte block, with the update stage being repeated until the last full block of data (e.g., in the data file or stream) is reached.

Figure 3A:
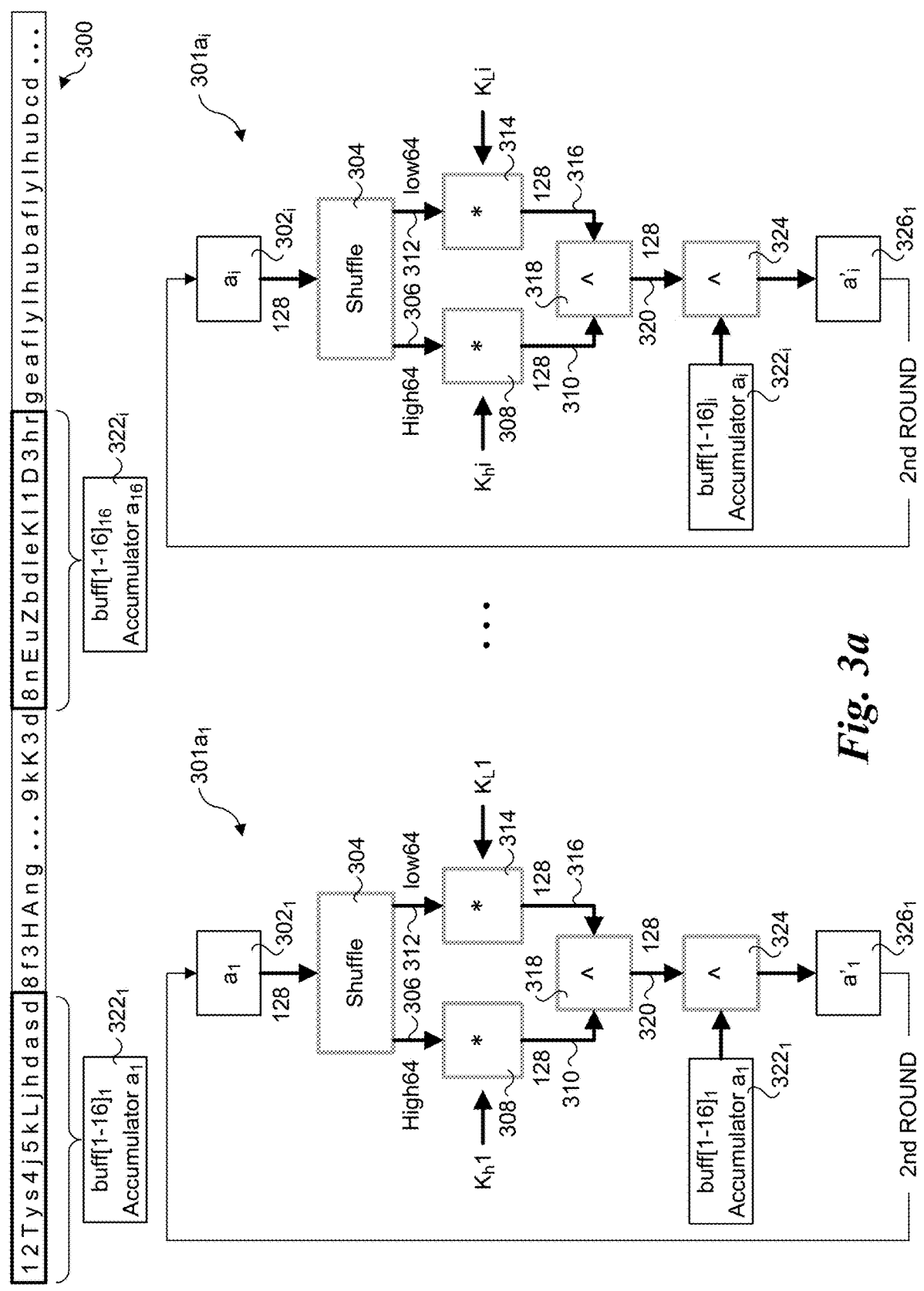
FIG. 3a is a process flow diagram illustrating input and operations performed in parallel during a first round of the update stage of FIG. 1 employing the init value as an input, according to one embodiment.
Figure 4A:
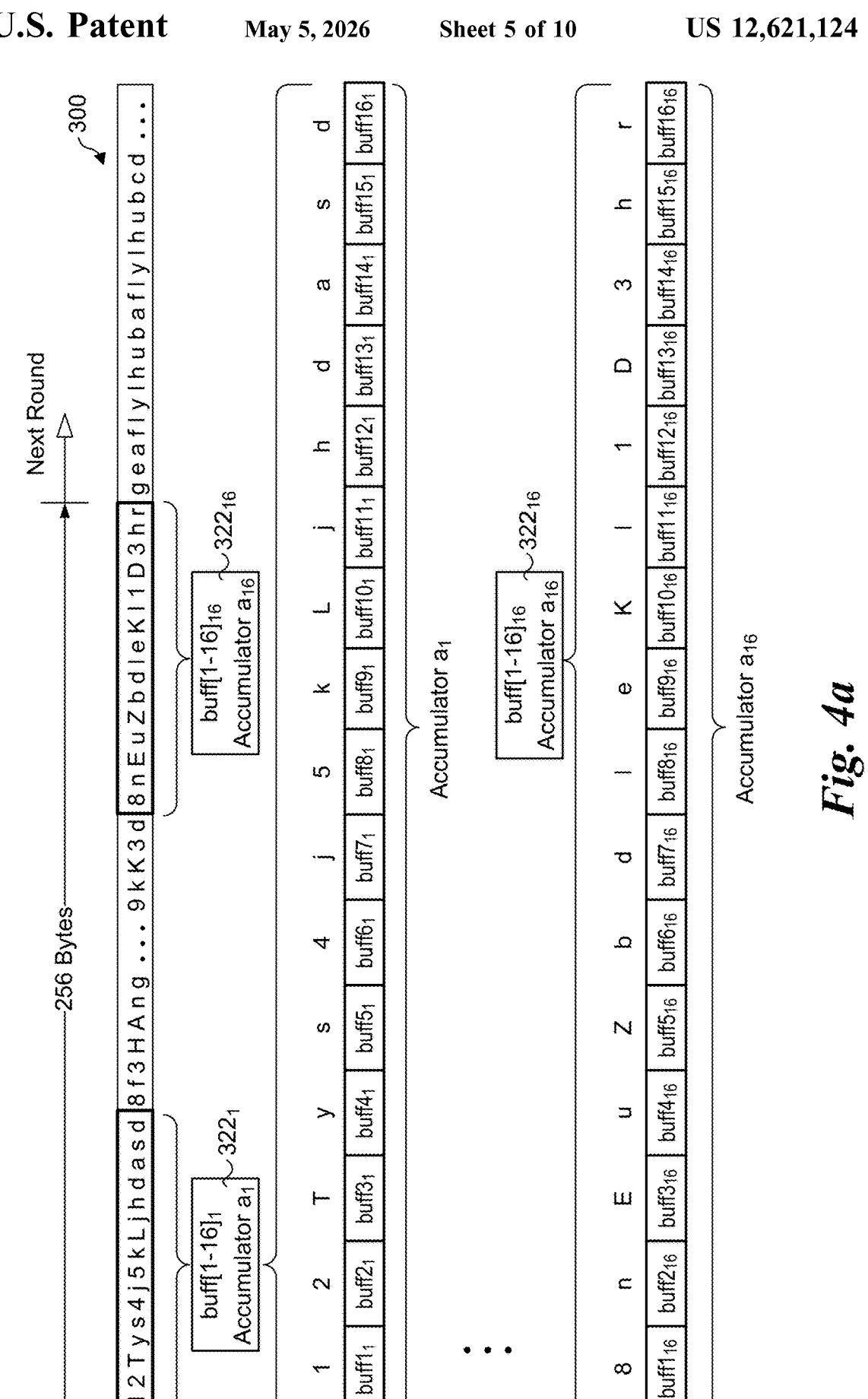
FIG. 4a is a diagram showing data from a first portion of input data being loaded into sets of accumulators to be processed during a first round of the update stage.

FIGS. 3a and 4a apply to the first round of the update stage. As shown in FIG. 3a, there are i instances of update stage logic flows $301a_1 \ldots 301a_i$. In the illustrated embodiment, i=16, noting this is merely exemplary and non-limiting. Each instance of the update stage logic flows $301a_1 \ldots 301a_i$ updates data in a respective 128-bit accumulator $\{a_1, \ldots, a_{16}\}$. Each 128-bit accumulator is used to buffer 16 8-bit values, where the buffers are labeled buff[1-16]$_1 \ldots$ buff[1-16]$_{16}$ in the Figures herein.

FIG. 4a shows a string of input data 300 to be hashed. Input data 300 are partitioned into 256-byte blocks that are split into multiple sub-blocks of data that are processed in parallel, beginning with the first byte in the input data. Each accumulator stores a sub-block of data comprising a sequence of 16 bytes (e.g., 8-bit ASCII characters, in the illustrated embodiment). As shown in FIG. 4a, the first 16 characters 1 2 T y s 4 j 5 k L j h d a s d are stored in an accumulator $322_1$, while characters at byte positions 240-256 (8 n E u Z b d 1 e K I 1 D 3 h r) are store in an accumulator $322_{16}$.

Returning to FIG. 3a, each of first round update flows $301a_1 \ldots 301a_i$ proceeds as follows. In the following description, first round update flow $301a_1$ is described, with the recognition that similar operations and logic would be implemented for each of the i instances of the first round update flow logic. The flow begins with an $a_1$ value 3021 which is a 128-bit random value, noting that each of $a_1 \ldots a_i$ is a different 128-bit random value. A 128-bit shuffle operation is performed in a block 304 to spread mixing power and maximize each input bit position's probability to affect all output bits. The high 64 bits 306 output from shuffle block 304 are multiplied by a constant $K_h1$ in a carry-less multiplication block 308, generating a 128-bit output 310. In parallel, the low 64 bits 312 output from shuffle block 304 are multiplied by a constant $K_L1$ in a second carry-less multiplication block 314, generating a 128-bit output 316. In one embodiment $K_h1$ and $K_L1$ comprise 64 bit constants that are taken from a list of random constants.

In an XOR block 318 128-bit outputs 310 and 316 are bitwise XOR'ed to generate a 128-bit XOR output 128. In an XOR block 324, the 16 character byte values (collectively 128 bits) in accumulator $322_1$ are bitwise XOR'ed with XOR output 128 to generate an update stage round output $326_1$ (also labeled $a'_1$).

As illustrated by first round update flow $301a_i$, the 16 character byte values in each of the i accumulators $322_i$ will be processed in parallel in a similar manner. As further shown, a different pair of constants $K_hi$ and $K_Li$ for each of the i accumulators $322_i$ will be used for carry-less multiplication blocks 308 and 314.

Figure 3B:
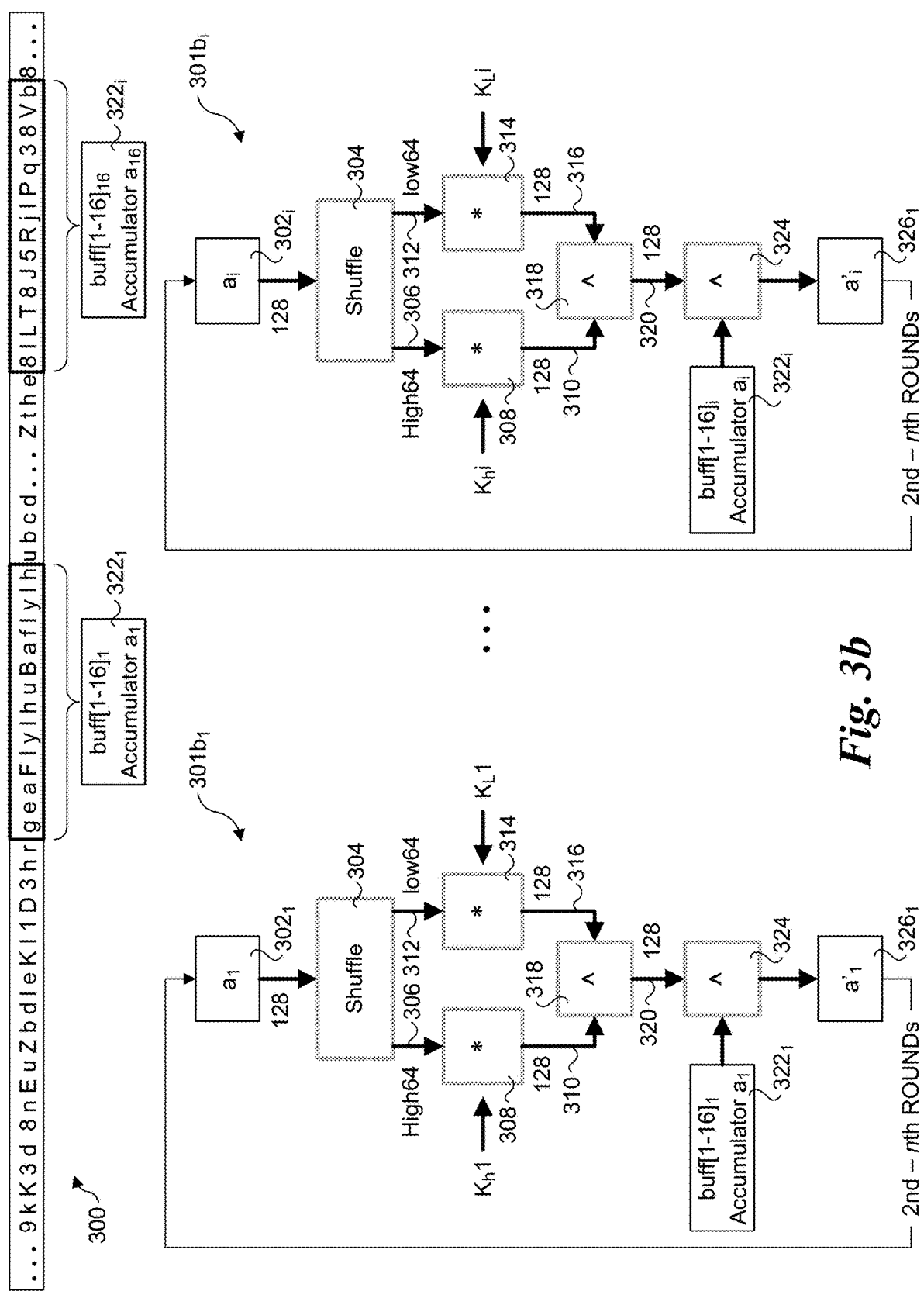
FIG. 3b is a process flow diagram illustrating input and operations performed by subsequent rounds of the update stage, according to one embodiment.

FIGS. 3b and 4b show processing of the next 256 bytes in input data 300, where similar operations are performed for each subsequent block of 256 bytes until the last full block of input data is reached. As shown in FIG. 4b, in this round the 16 characters in accumulator $322_1$ are g e a F I y I h u B a f I y I h, while the 16 characters in accumulator $322_{16}$ are 8 I L T 8 J 5 R j I P q 3 8 Vb.

Returning to FIG. 3*b*, as indicted by like-numbered blocks and values in FIGS. 3*a* and 3*b*, the operations performed by update flows 301*b*, 301*b*, are similar to those performed by first round update flows 301*a*₁ . . . 301*a*ᵢ, except the output 326₁ is used as the input (a₁ . . . aᵢ) for the next round rather than the random numbers used during the first round.

The following code listing in LIST 1 shows pseudocode for implementing an update stage round, according to one embodiment.

```
                              LIST 1

1.   while (len >= 256) {
    2.     for (i = 0; i < 16; i++) {
    3.        __m128i acci = _mm_shuffle_epi8(acc[i], shufx);
    4.        acc[i] =
    5.           _mm_clmulepi64_si128(acci, k[i], 0x00)
    6.         ^ _mm_clmulepi64_si128(acci, k[i], 0x11)
    7.         ^ _mm_loadu_si128((__m128i*)&buf[i*16]);
    8.      }
    9.      len -=256;
    10.     buf += 256;
    11.   }
```

Where k[i] are constants and acc[1 . . . 16] are the accumulators. In one embodiment, this block operation can also be optimized to efficiently use 512-bit SIMD (Single Instruction Multiple Data) AVX512 vpclmul instructions. Using this and/or other 512-bit SIMD instructions, four accumulators worth of data can be loaded into a processor's registers and processed via execution of a single instruction.

Finalize Stage

Figures 5A, 5B:
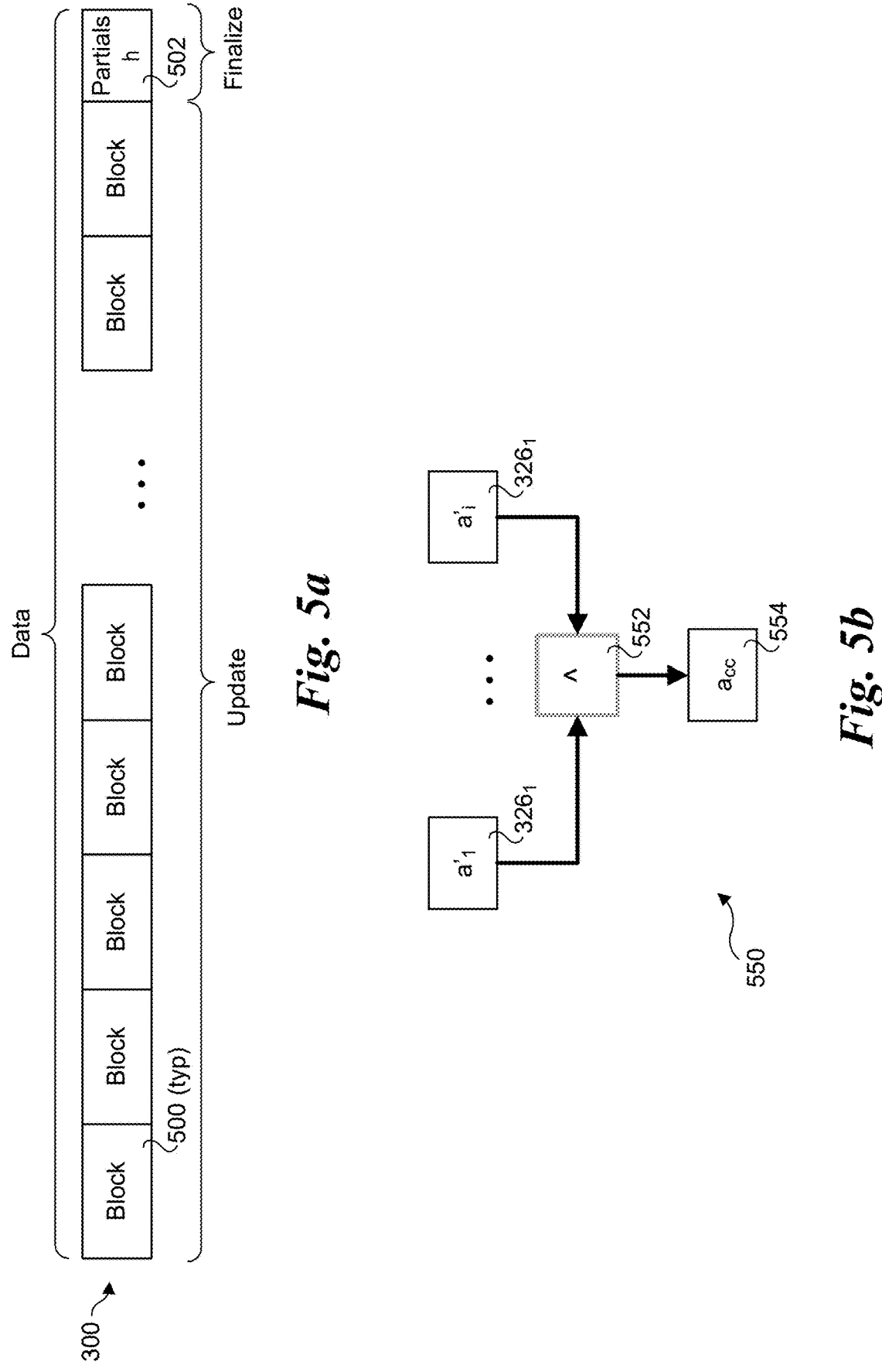
FIG. 5a is shows the input data being partitioned into multiple fixed-size blocks followed by a partial h having a size less than the block size.
FIG. 5b is a process flow diagram illustrating data output during the last round of the update stage being bitwise XOR'ed to generate an $a_{cc}$ value.

As shown in FIG. 5*a*, the update stage for data 300 is performed on 256-byte blocks 500 until the last complete block is reached. The remaining data comprises partials h (502). As shown in flow diagram 550 in FIG. 5*b*, following the last round of the update stage the 128-bit values for the round a'₁ . . . a'ᵢ outputs (326₁ . . . 326ᵢ) are bitwise XOR'ed in a block 552 to yield a 128-bit aₒₒ 554.

Figure 6:
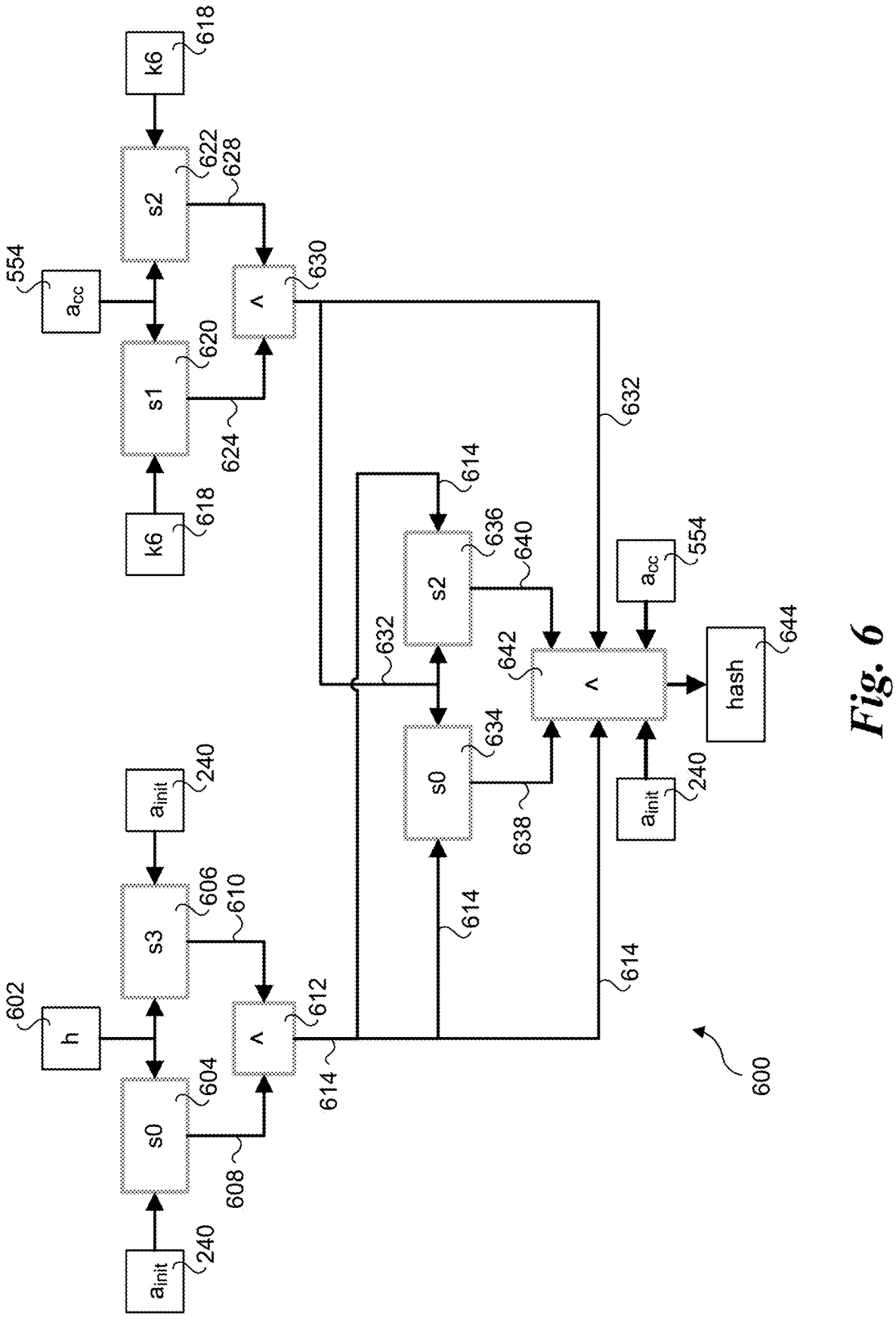
FIG. 6 is a process flow diagram illustrating inputs and operations performed during the finalize stage, according to one embodiment.

The finalize stage takes inputs from the init stage, aₒₒ 554, and remaining partials h 502 to perform a final reduction to a 128-bit hash as shown in FIG. 6. To get the necessary mixing of all partials but still fast for small inputs, we employ modern operations added to accelerate cryptography, pclmul and sha extensions, but without the excessive rounds (64-80) necessary for a fully cryptographic hash. Blocks labeled s0, s1, s2, and s3 represent the instruction 'sha1rnds4 xmm1, xmm2, imm8 {0-3}', which is normally used as part of an sha1 acceleration but here we reuse the sha1 instruction without sister instructions for reduced latency. For s0 imm8=0, for s1 imm8=1, for s2 imm8=2, and s3 imm8=3. In one embodiment, segments of finalize can still be implemented in parallel or concurrent with other stages.

FIG. 6 shows a process flow diagram 600 illustrating operations performed during the finalize stage, in one embodiment. Beginning at the upper left corner of diagram 600 the inputs include a remaining partial h 502 of the input data (i.e., the remaining portion of data after the last full 256-byte block), and a pair of aᵢₙᵢₜs 240. In an S0 block 604 a first sha1 calculation is performed using inputs 502 and 240. As mentioned above, in one embodiment the sha1rnds4 instruction is used with imm8=0. The sha1rnds4 instruction performs four rounds of SHA1 operation operating on SHA1 state (A, B, C, D) from xmm1, with a pre-computed sum of the next 4 round message dwords and state variable E from xmm2/m128. The immediate byte (imm8) controls logic functions and round constants.

The s0 block 604 calculation outputs a 128-bit value 608 while block S3 operation (which uses imm8=3) outputs a 128-bit value 610. Output values 608 and 610 are then bitwise XOR'ed in an XOR block 612 to produce a 128-bit output value 614.

In parallel, the operations shown in the upper right of process flow diagram 600 are performed. The inputs to both an s1 block 620 and an s1 block 622 are aₒₒ 554 and an integer constant k6 618, with imm8=1 for s1 block 620 and imm8=2 for s2 block 622. An output value 624 from s1 block 620 and an output value 628 from s2 block 622 are then bitwise XOR'ed in an XOR block 630 to produce a 128-bit output value 632.

Output values 614 and 632 are provided as inputs to each of an S0 block 634 and an s2 block 636, which respectively output 128-bit values 638 and 640. In an XOR block 642, output values 614, 630, 638, 640, aᵢₙᵢₜ 240, and aₒₒ 544 are bitwise XOR'ed to generate a final 128-bit hash 644.

Figure 6A:
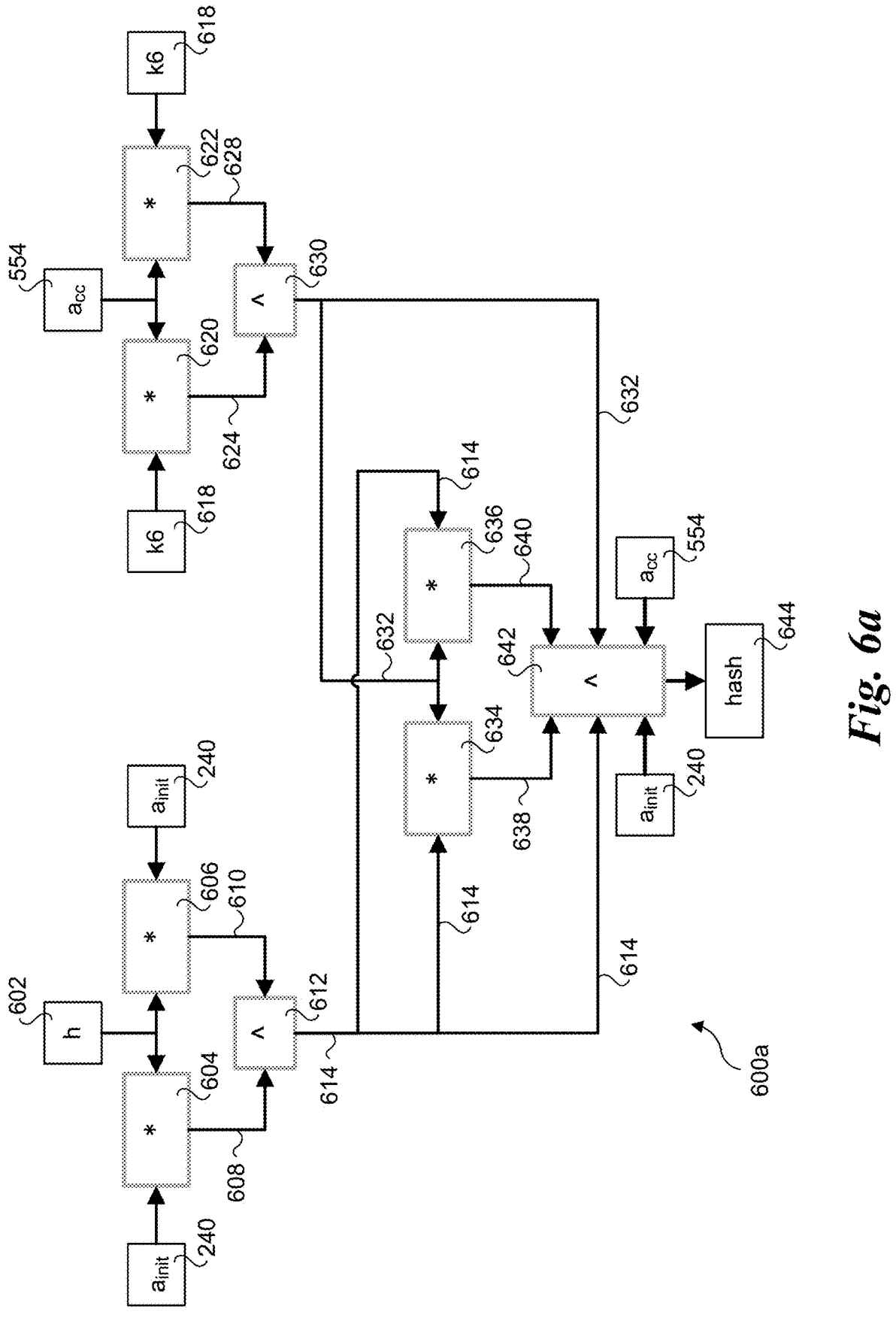
FIG. 6a is a process flow diagram illustrating an alternative embodiment of the finalize stage under which SHA1 operations are replaced with carry-less multiplication operations.

In an alternate embodiment of the finalize stage, only clmul and integer operations are performed, which results in slightly slower execution but similar quality if needed for greater portability. In this embodiment, blocks labeled s0, s1, s2, and s3 would be replaced with indicating carry-less multiplication operations, as shown in a process flow diagram 600*a* in FIG. 6*a*.

Application

The final hash (digest) generated by hash solutions described and illustrated herein can pass all 18 quality tests in the smasher+ suite such as collision probability, bit avalanche, Perlin noise, permutation, sparse, differential, cyclic and others. The smasher is the highest-quality hash digest analysis tool we are aware of producing a log file of ~100 KB size. Very few functions have been designed to pass all the tests. While not intended to be of fully cryptographic quality, a good quality hash can fulfil a variety of use cases such as data integrity, hash mapping, database, and bloom filters.

Example Computing System

Figure 7:
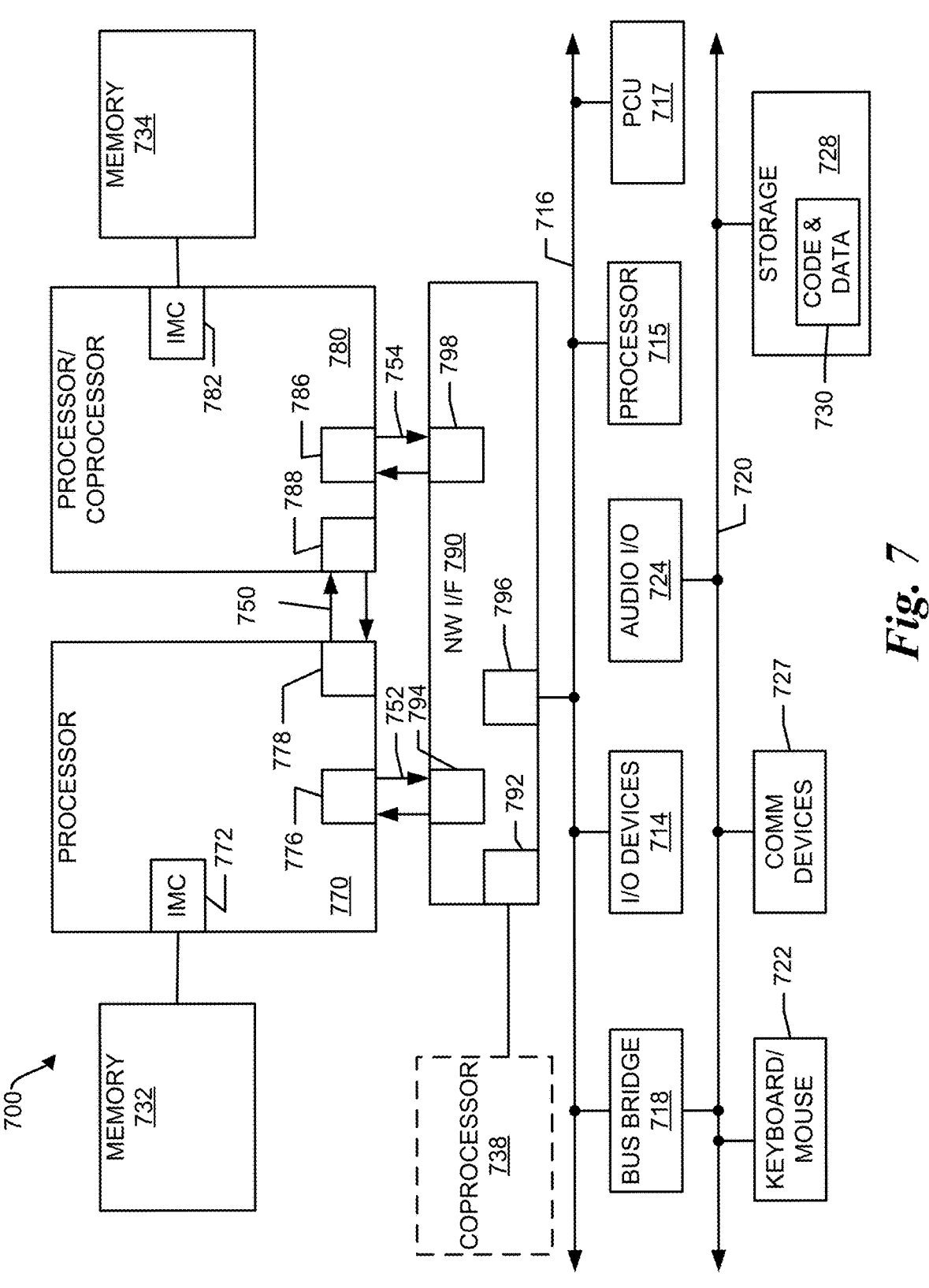
FIG. 7 is a diagram illustrating an example computing system that may be used to practice one or more embodiments disclosed herein.

FIG. 7 illustrates an example computing system. Multiprocessor system 700 is an interfaced system and includes a plurality of processors or cores including a first processor 770 and a second processor 780 coupled via an interface 750 such as a point-to-point (P-P) interconnect, a fabric, and/or bus. In some examples, the first processor 770 and the second processor 780 are homogeneous. In some examples, first processor 770 and the second processor 780 are heterogenous. Though the example system 700 is shown to have two processors, the system may have three or more processors, or may be a single processor system. In some examples, the computing system is a system on a chip (SoC).

Processors 770 and 780 are shown including integrated memory controller (IMC) circuitry 772 and 782, respectively. Processor 770 also includes interface circuits 776 and 778; similarly, second processor 780 includes interface circuits 786 and 788. Processors 770, 780 may exchange information via the interface 750 using interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a network interface (NW I/F) 790 via individual interfaces 752, 754 using interface circuits 776, 794, 786, 798. The network interface 790 (e.g., one or more of an interconnect, bus, and/or fabric, and in some examples is a chipset) may optionally exchange information with a coprocessor 738 via an interface circuit 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 770, 780 or outside of both processors, yet connected with the processors via an interface such as P-P interconnect, such that either or both processors' local cache information may be stored in the shared cache if a processor is placed into a low power mode.

Network interface 790 may be coupled to a first interface 716 via interface circuit 796. In some examples, first interface 716 may be an interface such as a Peripheral Component Interconnect (PCI) interconnect, a PCI Express interconnect or another I/O interconnect. In some examples, first interface 716 is coupled to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interface 716, along with a bus bridge 718 which couples first interface 716 to a second interface 720. In some examples, one or more additional processor(s) 715, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 716. In some examples, second interface 720 may be a low pin count (LPC) interface. Various devices may be coupled to second interface 720 including, for example, a keyboard and/or mouse 722, communication devices 727 and storage circuitry 728. Storage circuitry 728 may be one or more non-transitory machine-readable storage media, such as a disk drive, Flash drive, SSD, or other mass storage device which may include instructions/code and data 730. Further, an audio I/O 724 may be coupled to second interface 720. Note that other architectures than the point-to-point architecture described above are possible. For example, instead of the point-to-point architecture, a system such as multiprocessor system 700 may implement a multi-drop interface or other such architecture.

Generally, the cores of the processors may employ a modern CPU ISA that includes some of the instructions referred to herein, such as SHA1 instructions and 512-bit SIMD instructions, which may include AVX512 vpclmul instructions in some embodiments.

In addition to implementing the hash solution via execution of instructions on a processor, multiple processors, or multiple cores of a processor, all or a portion of the logic shown in the diagrams herein may be implemented in hardware using embedded logic. For example, the embedded logic may include pre-programmed logic (e.g., and ASIC), programmable logic (e.g., a Field Programmable Gate Array (FPGA) or other programmable logic device(s)), and/or executing firmware instructions or embedded software instructions on an embedded processor or the like. In one embodiment all or a portion of operations for implementing the hash solution are implemented in an accelerator that may be integrated on an SoC or may comprise a separate chip, expansion board, or part of a stand-alone system (e.g., deployed in an accelerator drawer or chassis under a distributed architecture).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'i', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing a non-cryptographic hash over input data, comprising:
   performing a first stage to generate an initialization (init) value;
   performing multiple rounds of an update stage on sequential blocks of the input data, wherein a round of the update stage employs an output from a previous round as an input to that round, wherein rounds of the update stage operate on multiple sub-blocks of input data in parallel using multiple sets of accumulators; and
   performing a finalize stage operating on an output from a last round of the update stage, partial data following a last block of input data and the init value as an input, wherein the finalize stage employs SHA (Secure Hash Algorithm) instructions or clmul (carry-less multiplication) instructions, in part, to generate a hash digest.

2. The method of claim 1, wherein each block comprises 256 bytes and each set of accumulators comprise 16 one-byte accumulators.

3. The method of claim 1, multiple operations are performed on each sub-block of data during an update stage round, including one or more carry-less multiplication operations and at least one shuffle operation.

4. The method of claim 1, wherein one or more 512-bit Single Instruction Multiple Data (SIMD) clmul instructions are employed during a round of an update stage.

5. The method of claim 1, wherein the hash digest comprises a 128-bit hash digest.

6. The method of claim 1, wherein the SHA instructions comprise SHA1 instructions.

7. The method of claim 1, wherein generation of the init value employs a random seed and comprises multiple operations including a shuffle operation.

8. The method of claim 1, further comprising employing multiple bitwise XOR operations during a round of an update stage and the finalize stage.

9. The method of claim 1, wherein rounds of the update stage operating on multiple sub-blocks of data employs random constants for each sub-block.

10. A non-transitory machine-readable storage medium having instructions stored thereon configured to be executed on one or more processors to generate a non-cryptographic hash digest over input data, wherein generation of the non-cryptographic hash digest comprises:

performing a first stage to generate an initialization (init) value;

performing multiple rounds of an update stage on sequential blocks of the input data, wherein a round of the update stage employs an output from a previous round as an input to that round and employs carry-less multiplication operations on m-bit values, wherein rounds of the update stage operate on multiple sub-blocks of input data in parallel using multiple sets of accumulators; and performing a finalize stage operating on an output from a last round of the update stage partial data following a last block of input data and the init value as an input, wherein the finalize stage generates and n-bit hash digest, where n>m.

11. The non-transitory machine-readable storage medium of claim 10, wherein each block comprises 256 bytes and each set of accumulators comprise 16 one-byte accumulators.

12. The non-transitory machine-readable storage medium of claim 10, multiple operations are performed on each sub-block of data during an update stage round, including one or more carry-less multiplication operations and at least one shuffle operation.

13. The non-transitory machine-readable storage medium of claim 10, wherein the hash digest comprises a 128-bit hash digest and wherein instructions include one or more 512-bit Single Instruction Multiple Data (SIMD) clmul instructions that are executed during a round of an update stage.

14. The non-transitory machine-readable storage medium of claim 10, wherein rounds of the update stage operating on multiple sub-blocks of data employs random constants for each sub-block.

15. A computing system, comprising:

one or more processors;

memory, operatively coupled to the one or more processors; and instructions, to be executed on the one or more processors to enable the computing system to generate an n-bit non-cryptographic hash digest over input data by:

performing a first stage to generate an initialization (init) value;

performing multiple rounds of an update stage on sequential blocks of the input data, wherein a first round of the update stage uses first values as an input and a subsequent round of the update stage employs an output from a previous round as an input to that round, wherein an update stage round employs carry-less multiplication instructions operating on m-bit data values, wherein m<n, wherein rounds of the update stage operate on multiple sub-blocks of data in parallel using multiple sets of accumulators; and performing a finalize stage operating on the init value, on an output from a last round of the update stage and partial data following a last block of input data to generate the n-bit non-cryptographic hash digest.

16. The computing system of claim 15, wherein multiple operations are performed on each sub-block of data during an update stage round, including at least one shuffle operation.

17. The computing system of claim 15, wherein the finalize stage employs SHA (Secure Hash Algorithm) instructions executed on a processor.

18. The computing system of claim 15, wherein rounds of the update stage operating on multiple sub-blocks of data employs random constants for each sub-block.

* * * * *